United States Patent
Tanoue

[11] Patent Number: 6,041,238
[45] Date of Patent: Mar. 21, 2000

[54] CHANNEL ASSIGNMENT METHOD IN MOBILE COMMUNICATIONS SYSTEM

[75] Inventor: Katsumi Tanoue, Tokyo, Japan

[73] Assignee: NEC Corporation, Tokyo, Japan

[21] Appl. No.: 09/106,258

[22] Filed: Jun. 29, 1998

[30] Foreign Application Priority Data

Jun. 30, 1997 [JP] Japan ............................ 9-174330

[51] Int. Cl.[7] .................. H04J 3/12; H04B 1/00; H04L 12/28
[52] U.S. Cl. .................. 455/452; 455/450; 455/451; 455/464; 455/513; 455/67.3; 370/329; 370/330; 370/337; 370/336; 370/252; 370/280
[58] Field of Search .................. 455/450, 451, 455/452, 464, 513, 517, 67.3; 370/329, 330, 337, 336, 252, 280

[56] References Cited

U.S. PATENT DOCUMENTS

| | | | |
|---|---|---|---|
| 5,491,837 | 2/1996 | Haartsen | 455/62 |
| 5,497,505 | 3/1996 | Koohgoli et al. | 455/450 |
| 5,507,034 | 4/1996 | Bodin et al. | 455/452 |
| 5,579,306 | 11/1996 | Dent | 370/329 |
| 5,774,808 | 9/1998 | Sarkioja et al. | 455/452 |
| 5,778,318 | 7/1998 | Talarmo et al. | 455/452 |
| 5,809,059 | 9/1998 | Souissi et al. | 370/329 |
| 5,903,843 | 5/1999 | Suzuki et al. | 455/452 |
| 5,943,340 | 8/1999 | Iemura | 370/329 |
| 5,946,306 | 8/1999 | Talarmo | 370/337 |
| 5,956,642 | 9/1999 | Larsson et al. | 455/452 |

FOREIGN PATENT DOCUMENTS

| | | |
|---|---|---|
| 7-212821 | 8/1995 | Japan . |
| 8-195977 | 7/1996 | Japan . |
| 9-102979 | 4/1997 | Japan . |

*Primary Examiner*—Wellington Chin
*Assistant Examiner*—Simon Nguyen
*Attorney, Agent, or Firm*—Whitham, Curtis & Whitham

[57] ABSTRACT

A communication channel is dynamically assigned to a mobile station in autonomous decentralized channel assignment in TDMA/TDD communications system. An interference detection criterion is determined depending on a signal strength of a call request signal. It is determined whether interference occurs in a transmitting time slot relative to the interference detection criterion in a selected channel, and further determined whether interference occurs in a receiving time slot relative to a predetermined interference detection criterion in the selected channel. When it is determined that no interference occurs in the selected transmitting and receiving time slots, the selected channel is assigned to the mobile station.

14 Claims, 4 Drawing Sheets

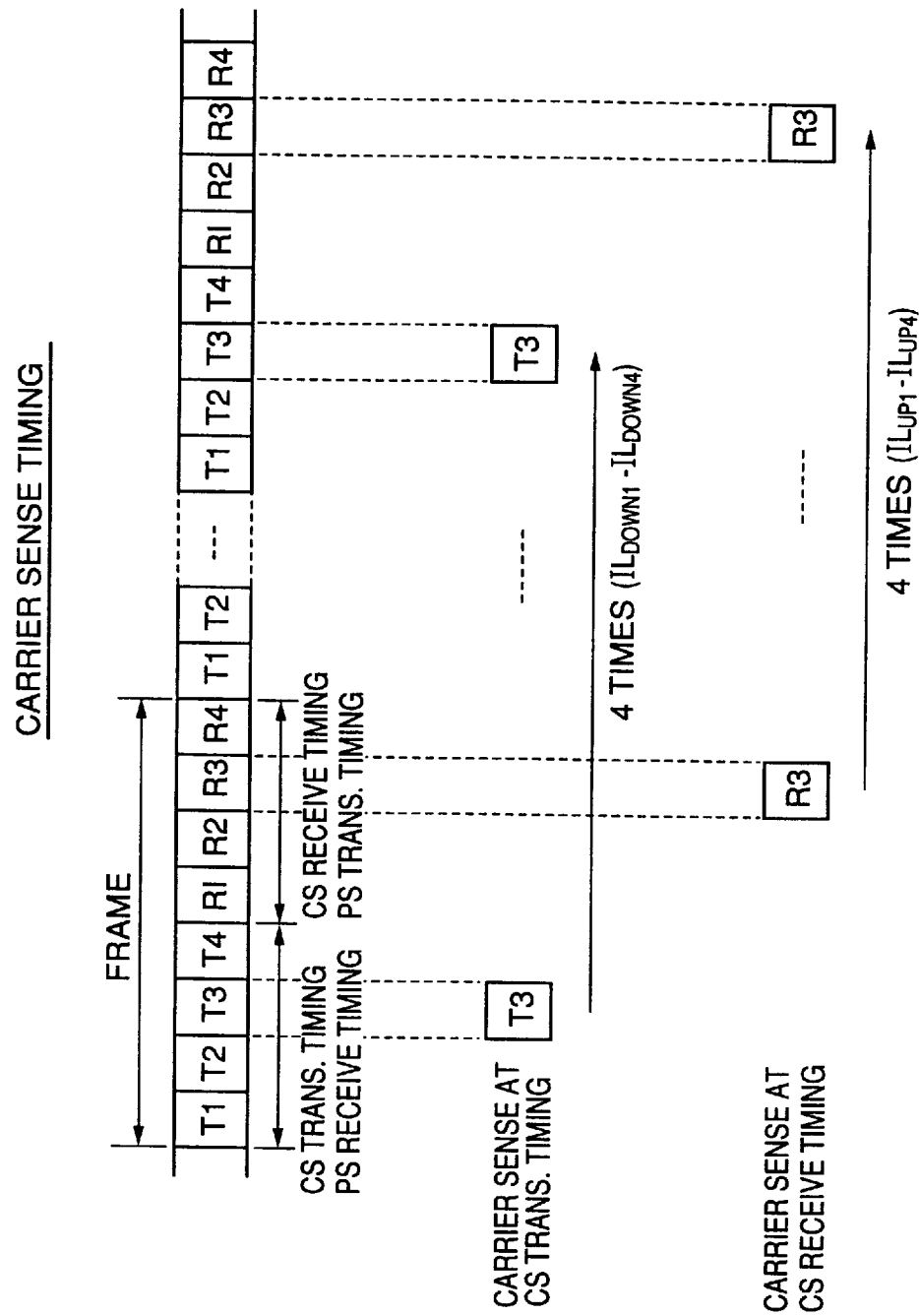

CHANNEL ASSIGNMENT METHOD IN MOBILE COMMUNICATIONS SYSTEM

BACKGROUND OF THE INVENTION

1. Field of the Invention

The present invention generally relates to a mobile communications system, and in particular to a method for assigning a communication channel to a mobile terminal according to a carrier sensing scheme.

2. Description of the Related Art

Recently, to achieve effective use of available frequencies, a cellular communications system has employed such a channel assignment scheme that each cell station can assign one of all available channels to a mobile terminal even at the same frequency when it is determined that the degree of interference is sufficiently low at that frequency. Such a channel assignment scheme is called autonomous decentralized dynamic channel assignment.

In the case of personal communications system such as PHS (Personal Handy-phone System), TDMA/TDD (Time Division Multiple Access/Time Division Duplex) scheme has been employed. It is determined whether no interference occurs in a selected channel and, if no interference, then the selected channel is assigned to the mobile terminal which has requested a communication channel. On the other hand, at the mobile terminal, it is determined whether no interference occurs in the assigned channel and, if no interference, then communication is started at the assigned channel. Such a dynamic channel assignment method is called a carrier-sense channel assignment method. It should be noted that the cell station performs the carrier sensing operation, that is, detects interference level only at the timing of receiving.

An improved carrier sensing channel assignment method has been proposed in Japanese Patent Unexamined Publication No. 7-212821. According to the improved method, when searching for a communication channel, a cell station performs the carrier sensing operation not only at receiving timing but also at transmitting timing. If the interference levels at receiving and transmitting timing are lower than a predetermined threshold, the communication is started using the assigned channel. In other words, the cell station can detect interference levels in both up-link and down-link channels before starting the communication. Therefore, the probability of call loss is reduced, compared with the above method.

However, even the improved method cannot detect accurate CIR (carrier-interference ratio) at the mobile station because power reduction of radio propagation between the cell station and the mobile terminal is not taken into account. Therefore, to assign a communication channel to each mobile terminal located within the cell using the same channel assignment algorithm, it is necessary to set the interference threshold level of up-link channels to a relatively low level. When the interference threshold level is set low, there may be cases where the cell station erroneously determines that the interference of a selected channel occurs at the mobile terminal though the CIR of the selected channel is sufficiently high at the mobile terminal. In such cases, the number of available channels is reduced, resulting in increased probability of call loss.

SUMMARY OF THE INVENTION

An object of the present invention is to provide a channel assignment method which can reduce the probability of call loss.

Another object of the present invention is to provide a channel assignment method which can improve use of frequencies by allocating communication channels with reliability.

According to the present invention, a communication channel is dynamically assigned to a mobile station in each base station of TDMA/TDD (Time Division Multiple Access/Time Division Duplex) communications system. When receiving a control signal from the mobile station, an interference detection criterion is determined depending on a signal strength of the control signal. After selecting a channel from a plurality of predetermined channels, it is determined whether interference occurs in a selected transmitting time slot relative to the interference detection criterion in a selected channel, and further determined whether interference occurs in a selected receiving time slot relative to a predetermined interference detection criterion in the selected channel. The selected channel is assigned as a communication channel to the mobile station when it is determined that no interference occurs in the selected transmitting and receiving time slots.

According to the present invention, it is determined whether interference occurs in a selected transmitting time slot using the interference detection criterion which varies depending on the control signal received from the mobile station. And when it is determined that no interference occurs in the selected transmitting and receiving time slots, the selected channel is assigned to the mobile station. Therefore, there is little probability that the mobile station detects interference when receiving, resulting in improved channel connection probability and reduced call loss probability.

BRIEF DESCRIPTION OF THE DRAWINGS

FIG. 4 is a time chart showing TDMA/TDD format at the cell station for explanation of carrier sensing timing in the embodiment.

DETAILED DESCRIPTION OF THE PREFERRED EMBODIMENT

Figure 1:
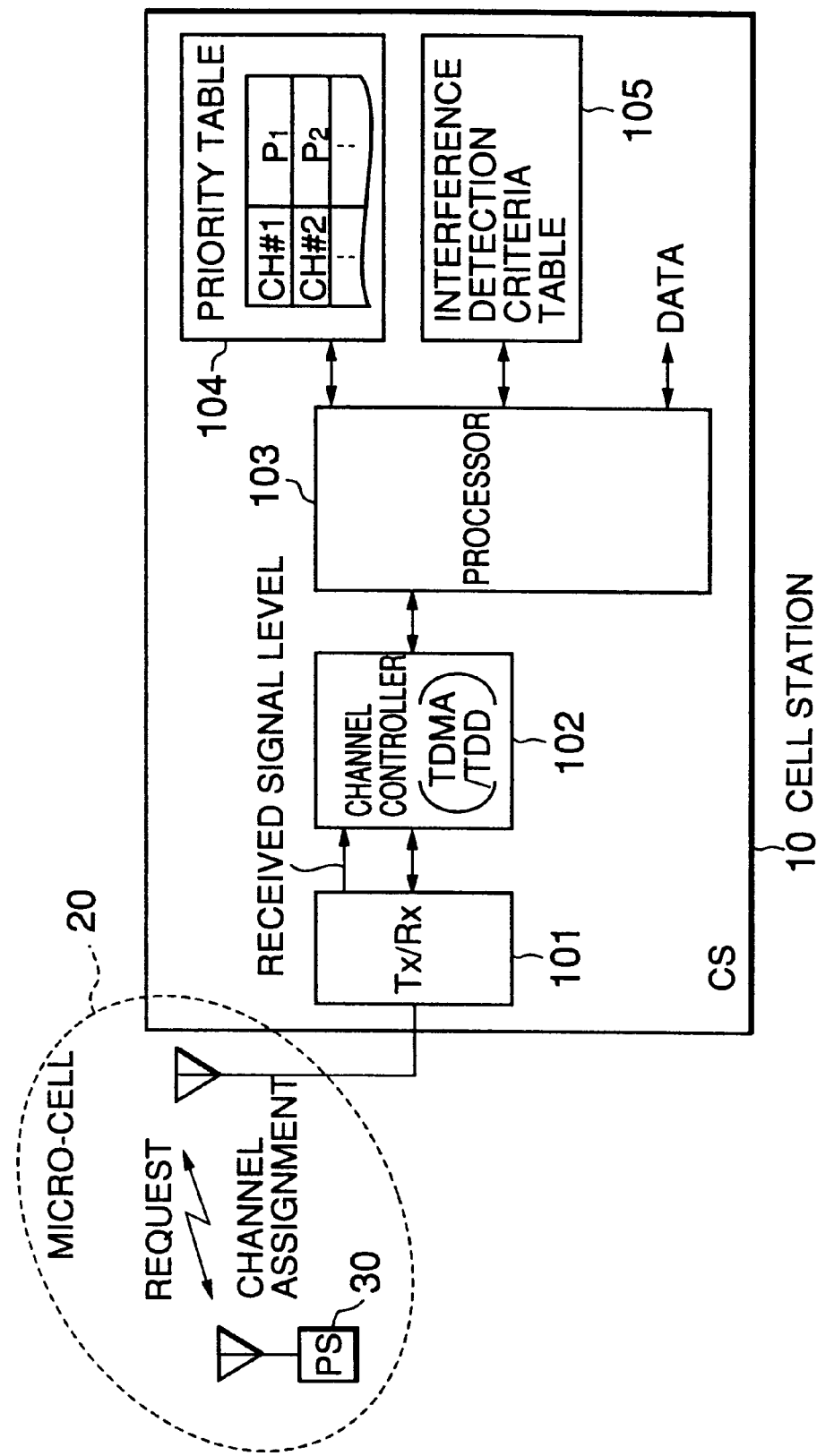
FIG. 1 is a block diagram showing a cellular communications system employing an embodiment of a channel assignment method according to the present invention.

Referring to FIG. 1, a PHS system has a plurality of cell stations each forming a micro-cell and each cell station (CS) 10 can communicate with a personal station (PS) 30 located in the micro-cell 20 thereof.

The cell station 10 is comprised of a radio transceiver 101 and a channel controller 102 which performs channel control according to TDMA/TDD scheme. When receiving a radio signal from the personal station 30, the radio transceiver 101 outputs demodulated data and the corresponding signal level to the channel controller 102. The cell station 10 is further comprised of a processor 103 which controls the operations of the cell station 10 including the carrier sensing dynamic channel assignment. The processor 103 performs the carrier sensing dynamic channel assignment using a priority table 104 and an interference detection criteria table 105 as will be described later. Further, the processor 103 performs the operation control by running control programs including the carrier sensing dynamic channel assignment which are previously stored in a memory (not shown).

The priority table 104 stores a priority value for each channel so as to search for channels in order of decreasing priority. The priority table 104 is updated each time channel assignment is performed as will be described later.

Figure 2:
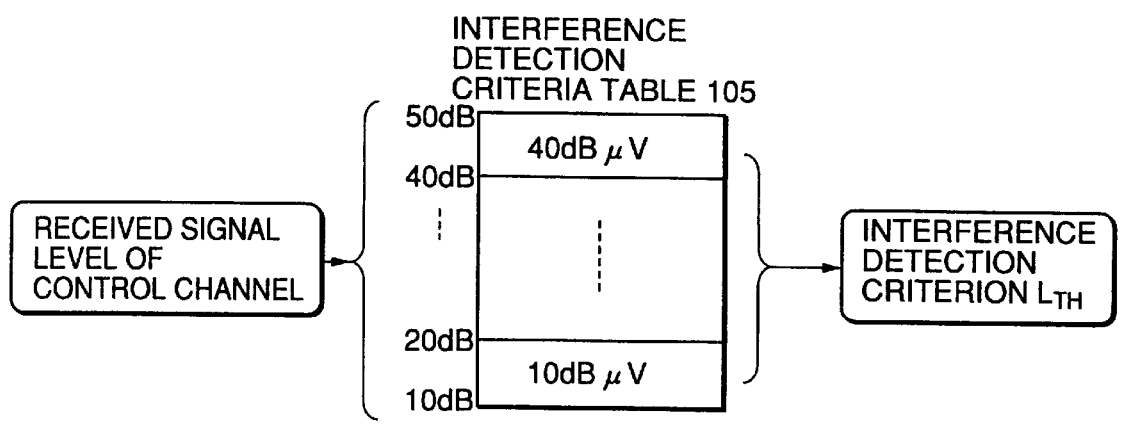
FIG. 2 is a flowchart showing the embodiment according to the present invention.

As shown in FIG. 2, the interference detection criteria table 105 contains the relationship between received signal levels and interference detection criteria so as to search for an interference detection criterion $L_{TH}$ corresponding to a received signal level. The higher the received signal level, the higher the interference detection criterion $L_{TH}$. More specifically, when the received signal level falls into a range from 10 dB to 20 dB, the interference detection criterion $L_{TH}$ is set to a lower criterion level 10 dB$\mu$V. When the received signal level increases to a range from 40 dB to 50 dB, the interference detection criterion $L_{TH}$ also increases to a higher criterion level 40 dB$\mu$V. Therefore, the interference determination can be properly performed depending on the received signal level.

Figure 3:
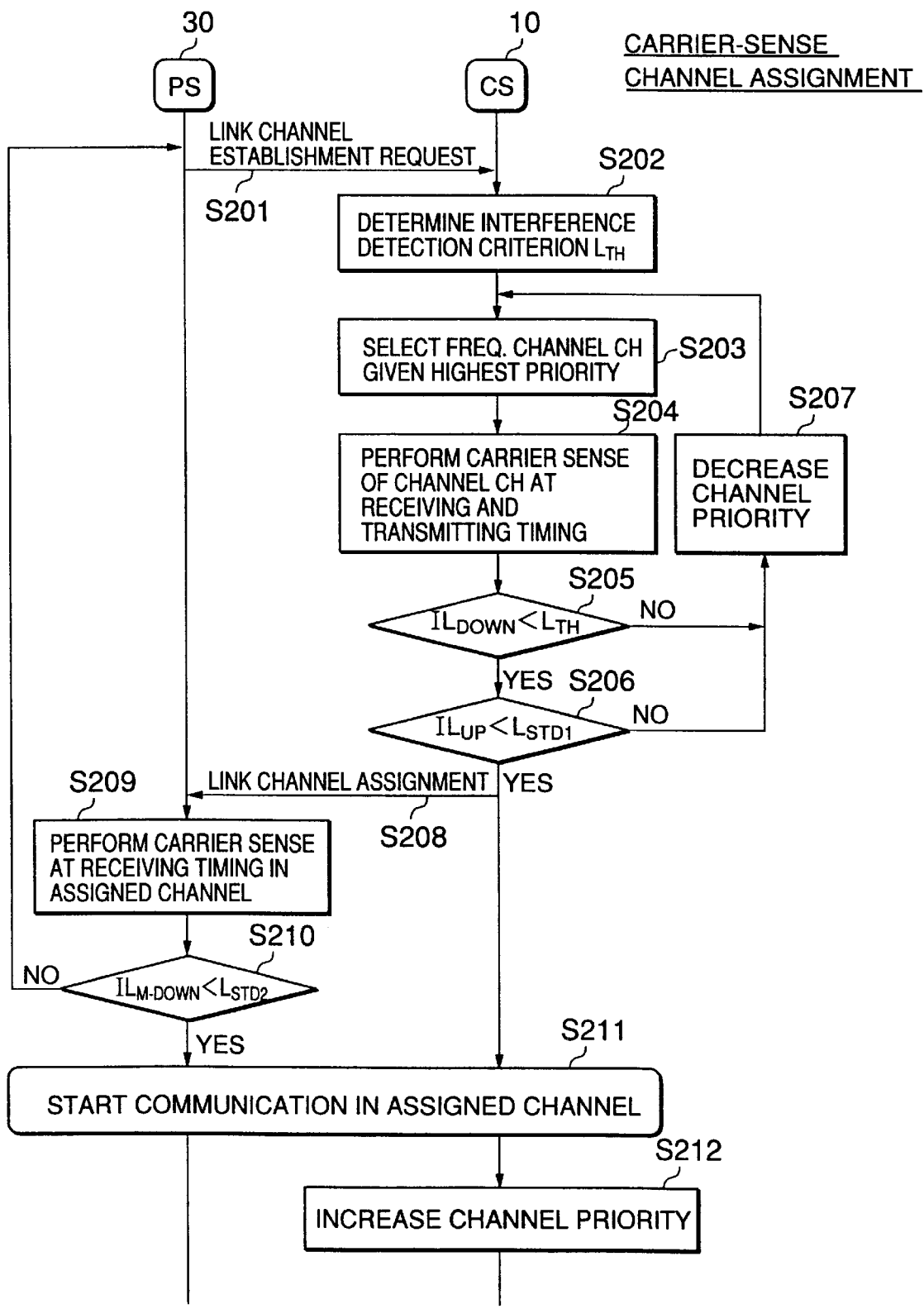
FIG. 3 is diagram showing an interference detection criteria table for explanation of interference detection criteria conversion in the embodiment.

Referring to FIG. 3, the personal station 30 transmits a link channel establishment request signal to the cell station 10 using the up-link control channel when registering its location, calling, called, and performing band-over between cell stations (step S201). When receiving the link channel establishment request signal, the processor 103 of the cell station 10 converts the received signal level of the up-link control channel to the corresponding interference detection criterion $L_{TH}$ by referring to the interference detection criteria table 105 (step S202). The interference detection criterion $L_{TH}$ is stored onto a memory (not shown).

Subsequently, the processor 103 selects one of available frequency channels to perform the carrier sensing operation by referring to the priority table 104 (step S203). More specifically, the processor 103 searches the priority table 104 for an available channel having the highest priority at that time.

When such a channel is selected, the selected channel CH is subjected to the carrier sensing at transmitting and receiving timing. The respective received signal levels at receiving and transmitting timing are stored as interference levels $IL_{UP}$ and $IL_{DOWN}$ onto the memory (step S204). As will be described later, the carrier sensing is performed over consecutive four frames at the transmitting and receiving timing (see FIG. 4).

Thereafter, the processor 103 compares the interference level $IL_{DOWN}$ of the transmitting timing to the interference detection criterion $L_{TH}$ obtained in the step S202 to determine whether $IL_{DOWN}$ is smaller than $L_{TH}$ (step S205). If $IL_{DOWN}$ is smaller than $L_{TH}$ during four consecutive frames (YES in step S205), then the processor 103 further compares the interference level $IL_{UP}$ of the receiving timing to interference level $L_{STD1}$ to determine whether $IL_{UP}$ is smaller than $L_{STD1}$ (step S206). The interference level $L_{STD1}$ of 26 dB$\mu$V is provided by Japanese standards RCR-STD28.

When $IL_{DOWN}$ is not smaller than $L_{TH}$ during at least one frame (NO in step S205) or when $IL_{UP}$ is not smaller than $L_{STD1}$ during at least one frame (NO in step S206), the processor 103 decreases the priority of the selected channel CH (step S207) and the control goes back to the step S203 where another channel is selected referring to the priority table 104. In this manner, the steps S203–S207 are repeatedly performed while searching the priority table 104 until an acceptable channel is found.

If $IL_{UP}$ is smaller than $L_{STD1}$ during four consecutive frames (YES in step S206), then the selected channel CH is allowed to be assigned to the personal station 30. More specifically, the cell station 10 transmits a link channel assignment signal to the personal station 30 using down-link control channel (step S208).

When receiving the link channel assignment signal, the personal station 30 is set to the assigned channel CH and performs the carrier sensing in the assigned channel CH at receiving timing (step S209). The received signal level at receiving timing is stored as interference level $IL_{H-DOWN}$ onto a memory. The carrier sensing is performed over consecutive four frames at receiving timing.

Thereafter, the interference level $IL_{H-DOWN}$ is compared to interference level $L_{STD2}$ to determine whether $IL_{H-DOWN}$ is smaller than $L_{STD2}$ over consecutive four frames (step S210). The interference level $L_{STD2}$ of 26 dB$\mu$V is provided by Japanese standards RCR-STD28.

When $IL_{H-DOWN}$ is not smaller than $L_{STD2}$ during at least one frame (NO in step S210), the control goes back to the step S201 where the personal station 30 transmits a link channel establishment request signal to the cell station 10 again.

If $IL_{H-DOWN}$ is smaller than $L_{STD2}$ during four consecutive frames (YES in step S210), then the personal station 30 starts communicating with the cell station 10 using the assigned channel CH (step S211).

At the cell station 10, when the communication is started, the processor 103 increases the priority of the assigned channel in the priority table 104 (step S212).

Referring to FIG. 4, in the case where time slots T3 and R3 are used for transmitting and receiving timing of the cell station 10, respectively, the carrier sensing is performed at the timing of time slot T3 to detect the interference level $IL_{DOWN}$ for consecutive four frames and at the timing of time slot R3 to detect the interference level $IL_{UP}$ for consecutive four frames.

The detected interference levels $IL_{DOWN1}$–$IL_{DOWN4}$ and $IL_{UP1}$–$IL_{UP4}$ are used to determine whether the selected channel is adequate for communication as described in steps S205 and S206 of FIG. 3. More specifically, if all the transmitting-timing interference levels $IL_{DOWN1}$–$IL_{DOWN4}$ are smaller than $L_{TH}$ (YES in step S205), then the processor 103 further compares each of the receiving-timing interference levels $IL_{UP1}$–$IL_{UP4}$ to interference level $L_{STD1}$ of 26 dB$\mu$V (step S206). If all the receiving-timing interference levels $IL_{UP1}$–$IL_{UP4}$ are smaller than $L_{STD1}$ (YES in step S206), then the selected channel CH is allowed to be assigned to the personal station 30. Contrarily, if at least one of $IL_{DOWN1}$–$IL_{DOWN4}$ is not smaller than $L_{TH}$ (NO in step S205) or when at least one of $IL_{UP1}$–$IL_{UP4}$ is not smaller than $L_{STD1}$ (NO in step S206), the processor 103 decreases the priority of the selected channel CH (step S207) and the control goes back to the step S203.

What is claimed is:

1. A method for dynamically assigning a communication channel to a mobile station in each base station of TDMA/TDD (Time Division Multiple Access/Time Division Duplex) communications system, comprising the steps of:

a) receiving a control signal from the mobile station;

b) determining an interference detection criterion depending on a signal strength of the control signal;

c) selecting a channel from a plurality of predetermined channels;

d) determining whether interference occurs in a selected transmitting time slot relative to the interference detection criterion in a selected channel;

e) determining whether interference occurs in a selected receiving time slot relative to a predetermined interference detection criterion in the selected channel; and f) assigning the selected channel as a communication channel to the mobile station when it is determined that no interference occurs in the selected transmitting and receiving time slots.

2. The method according to claim 1, wherein each of the predetermined channels has a priority value and, in the step c), a channel having a highest priority value is selected, wherein a priority value of the selected channel is decreased when it is determined that interference occurs in at least one of the selected transmitting and receiving time slots and is increased when communication is started in the selected channel.

3. The method according to claim 2, wherein, when it is determined that interference occurs in at least one of the selected transmitting and receiving time slots, another channel is selected in the step c).

4. The method according to claim 1, wherein,
the step d) comprises the steps of:
   detecting an interference level in the selected transmitting time slot a predetermined number of times; and
   determining whether each interference level in the selected transmitting time slot is smaller than the interference detection criterion, and
the step e) comprises the steps of:
   detecting an interference level in the selected receiving time slots the predetermined number of times; and
   determining whether each interference level in the receiving time slot is smaller than a predetermined interference detection criterion.

5. The method according to claim 1, further comprising the steps of:
at the mobile station,
   g) determining whether interference occurs in a receiving time slot of the mobile station relative to a predetermined interference detection criterion in the assigned channel, the receiving time slot of the mobile station corresponding to the transmitting time slot of the base station;
   h) starting communication with the base station in the assigned channel when it is determined that no interference occurs; and
   i) transmitting the control signal to the base station when it is determined that interference occurs.

6. The method according to claim 1, wherein the step b) comprises the steps of:
   storing a conversion table containing a plurality of signal strength ranges each corresponding to a different interference detection criterion; and
   searching the conversion tables for the signal strength of the control signal to determine the interference detection criterion corresponding to the signal strength of the control signal.

7. The method according to claim 6, wherein the interference detection criterion becomes higher with the signal strength of the control signal.

8. A system for dynamically assigning a communication channel to a mobile station in each base station of TDMA/TDD (Time Division Multiple Access/Time Division Duplex) communications system, comprising:
   a first detector for detecting a strength of a control signal received from the mobile station;
   a second detector for detecting an interference level in a selected transmitting and receiving time slots;
   a criteria table for storing a plurality of signal strength ranges each corresponding to a different interference detection criterion; and
   a processor for searching the criteria table for the signal strength of the control signal to determine an interference detection criterion corresponding to the signal strength of the control signal, determining whether interference occurs in a selected transmitting time slot relative to the interference detection criterion in a selected channel, determining whether interference occurs in a selected receiving time slot relative to a predetermined interference detection criterion in the selected channel, and assigning the selected channel as a communication channel to the mobile station when it is determined that no interference occurs in the selected transmitting and receiving time slots.

9. The system according to claim 8, further comprising:
   a priority table for storing priority values corresponding to the predetermined channels, respectively,
   wherein the processor searches the priority table for a channel having a highest priority value, decreases a priority value of the selected channel when it is determined that interference occurs in at least one of the selected transmitting and receiving time slots, and increases the priority value of the selected channel when communication is started in the selected channel.

10. The system according to claim 9, wherein, when it is determined that interference occurs in at least one of the selected transmitting and receiving time slots, the processor searches the priority table for another channel having a second highest priority.

11. The system according to claim 8, wherein the processor controls the second detector so as to detect an interference level in the selected transmitting time slot a predetermined number of times and an interference level in the selected receiving time slots the predetermined number of times, and determines whether each interference level in the selected transmitting time slot is smaller than the interference detection criterion and each interference level in the receiving time slot is smaller than a predetermined interference detection criterion.

12. The system according to claim 8, wherein the mobile station determines whether interference occurs in a receiving time slot of the mobile station relative to a predetermined interference detection criterion in the assigned channel, the receiving time slot of the mobile station corresponding to the transmitting time slot of the base station, starts communication with the base station in the assigned channel when it is determined that no interference occurs, and transmits the control signal to the base station when it is determined that interference occurs.

13. A carrier sensing method in a base station of autonomous decentralized TDMA/TDD (Time Division Multiple Access/Time Division Duplex) communications system, comprising the steps of:
   receiving a call request signal from a mobile station;
   determining an interference detection criterion depending on a signal strength of the call request signal;
   selecting a channel from a plurality of predetermined channels;
   sensing interference in a selected transmitting time slot relative to the interference detection criterion in a selected channel;
   sensing interference in a selected receiving time slot relative to a predetermined interference detection criterion in the selected channel,
   wherein the selected channel is assigned to the mobile station when no interference is sensed in both selected transmitting and receiving time slots.

14. The carrier sensing method according to claim 13, wherein the interference detection criterion becomes higher with the signal strength of the control signal.

* * * * *